United States Patent [19]

May

[11] Patent Number: 5,105,186

[45] Date of Patent: Apr. 14, 1992

[54] LCD TOUCH SCREEN

[75] Inventor: Gregory J. May, Corvallis, Oreg.

[73] Assignee: Hewlett-Packard Company, Palo Alto, Calif.

[21] Appl. No.: 529,099

[22] Filed: May 25, 1990

[51] Int. Cl.⁵ .............................................. G09G 3/36
[52] U.S. Cl. .................................. 340/784; 340/712; 341/31
[58] Field of Search ............... 340/706, 712, 707; 341/23, 31; 250/221

[56] References Cited

U.S. PATENT DOCUMENTS

| | | | |
|---|---|---|---|
| 3,971,013 | 7/1976 | Challoner et al. | 340/712 |
| 4,484,179 | 11/1984 | Kasday | 340/712 |
| 4,707,689 | 11/1987 | DiPiazza et al. | 340/706 |
| 4,723,836 | 2/1988 | Kono et al. | 340/707 |
| 4,782,328 | 11/1988 | Denlinger | 340/712 |
| 4,977,315 | 12/1990 | Purcell | 340/707 |

*Primary Examiner*—Jeffery A. Brier
*Assistant Examiner*—Regina Liang

[57] ABSTRACT

A touch screen includes a liquid crystal display (LCD) having a viewing surface through which light passes into and out of the display and a back surface comprising a transflector such as transflective film. The transflector reflects some of the light back through the display and viewing surface and transmits some of the light. An array of light dependent resistors (LDRs) or equivalent light detecting devices underlie the transflector and detect a change in the transmitted light caused by a touching of the viewing surface. The light detecting array may be integrated into a keyboard interface. Keys are then displayed on the viewing surface opposite LDRs in the array to indicate where the viewing surface must be touched to actuate a key.

15 Claims, 2 Drawing Sheets

LCD TOUCH SCREEN

TECHNICAL FIELD

This invention relates to optically-based touch sensitive screens, and more particularly to such screens for use with liquid crystal displays (LCDs).

BACKGROUND OF THE INVENTION

Touch sensitive screens ("touch screens") are devices that typically mount over a display such as a CRT. With a touch screen, a user can select from options displayed on the display's viewing surface by touching the surface adjacent to the desired option, or, in some designs, touching the option directly. Common techniques employed in these devices for detecting the location of a touch include mechanical buttons, crossed beams of infrared light, acoustic surface waves, capacitance sensing, and resistive membranes.

For example, U.S. Pat. No. 4,484,179 discloses an optically-based touch screen comprising a flexible clear membrane supported above a glass screen whose edges are fitted with photodiodes. When the membrane is flexed into contact with the screen by a touch, light which previously would have passed through the membrane and glass screen is trapped between the screen surfaces by total internal reflection. This trapped light travels to the edge of the glass screen where it is detected by the photodiodes which produce a corresponding output signal. The touch position is determined by coordinating the position of the CRT raster beam with the timing of the output signals from the several photodiodes.

U.S. Pat. No. 4,782,328 on the other hand, relies on reflection of ambient light from the actual touch source, such as a finger or pointer, into a pair of photosensors mounted at corners of the touch screen. By measuring the intensity of the reflected light received by each photosensor, a computer can calculate the location of the touch source with reference to the screen.

Touch screens that have a transparent surface which mounts between the user and the display's viewing surface have several drawbacks. The transparent surface may cause multiple reflections on the viewing surface, produce glare and reduce the contrast ratio between displayed segments and the display background. These problems are greatest with LCDs that rely solely on absorption of ambient light to differentiate displayed dots or segments from a reflective background. Without additional lighting, the quality of an LCD image viewed through such an intervening surface is considerably reduced.

SUMMARY OF THE INVENTION

An object of the invention, therefore, is to provide an improved LCD touch screen.

Another object of the invention is to provide such a touch screen that responds to changes in ambient light entering the LCD caused by a touching of the LCD's viewing surface.

A third object of the invention is to provide an LCD touch screen that is not positioned between the user and the display's viewing surface.

To achieve these objects, a touch screen in accordance with the invention includes an LCD having a viewing surface through which light passes into and out of the display and a back surface comprising a transflector such as transflective film. The transflector reflects some of the light back through the display and viewing surface and transmits some of the light. Light detecting means are situated for detecting a change in the light transmitted through the transflector caused by a touching of the viewing surface. Touching casts a distinct shadow over a portion of the viewing surface and thereby limits the amount of light transmitted through a portion of the transflector. The light detecting means may be any type of device such as a light dependent resistor (LDR), phototransistor, photodiode, solar cell or photocell which is capable of sensing such a change in ambient light filtered through a transflector on an LCD.

The touch screen may also include a threshold adjustment means, if desired, to distinguish between a touch shadow and other causes of a change in ambient light at the viewing surface. Such means may adjust the threshold level of transmitted light that the light detecting means must detect to indicate a touching of the viewing surface.

For use with the touch screen, signaling means may be connected to the light detecting means. The signaling means produces a signal in response to a detection of a change in transmitted light caused by a touching of the viewing surface. The signal indicates the location of the touch. An example of such signaling means is a keyboard interface.

The touch screen may be integrated with the LCD, such as by having the LCD display "keys" on its viewing surface on top of separate light detecting means that correspond to the displayed keys. For this integration, means are provided for controlling the LCD to indicate where the viewing surface must be touched for the light detecting means to detect the touch. An example of such means is a central processing unit that controls the LCD and responds to the light detecting means.

The foregoing and other objects, features and advantages of the invention will become more apparent from the following detailed description which refers to the accompanying drawings.

DETAILED DESCRIPTION

Figure 1:
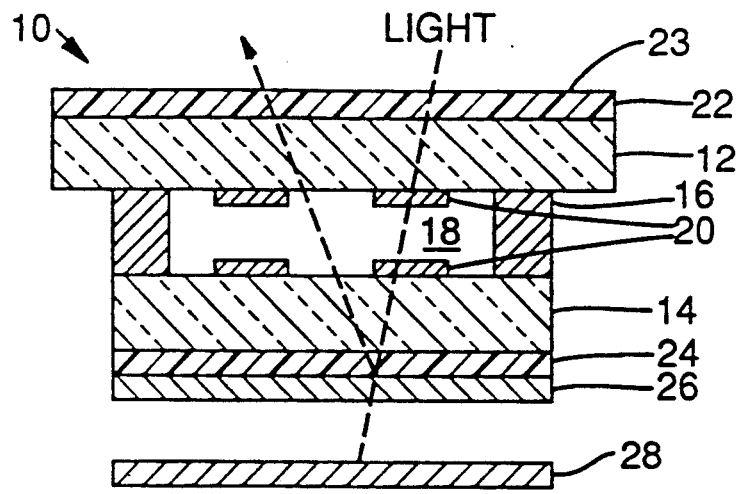
FIG. 1 is a cross sectional view of a liquid crystal display touch screen according to the invention.

FIG. 1 is a cross sectional view of an LCD touch screen 10 according to the invention. Parallel upper glass sheet 12 and a lower glass sheet 14 are separated by spacers 16. Sandwiched between the glass sheets is a thin layer of liquid crystal material 18. The inner surface of each piece of glass 12. 14 is coated with a transparent, conductive layer 20 of metal oxide. Affixed to the outer surface of upper glass sheet 12 is an upper polarizer 22 which comprises the display's viewing surface 23. Affixed to the outer surface of glass sheet 14 is a lower polarizer 24. Forming the back surface of the liquid crystal display is a transflector 26 adjacent to the lower polarizer 24. A transflector, as defined herein, transmits some of the light striking its surface and reflects some light. One example of a transflector is transflective film available from Nitto Electric Industrial Co., Ltd of Osaka, Japan. Adjacent to transflector 26 is a light detecting means such as an array 28 of light dependent resistors (LDRs) whose resistance varies with the intensity of light detected. In the present embodiment, the resistance increases as the light intensity decreases, such as occurs when a shadow is cast on the viewing surface 23. As more fully set forth below, such means are employed for detecting a change in the light transmitted through transflector 26 caused by a touching of viewing surface 23.

The two polarizers 22 and 24 are rotated 90 degrees from each other so normally no light would pass through both polarizers. However, the crystals of the intervening liquid crystal material 18, when not under the influence of an electric field, rotate the polarization of light passing through them by 90 degrees. Thus, the polarized light that passes through upper polarizer 22 is rotated by liquid crystal material 18 so that it also passes through the lower polarizer 24. The passed light then strikes transflector 26, which reflects some of the light back through the display and transmits some of the light onto light detecting array 28, as indicated by the dashed lines in FIG. 1. From the viewing surface 23, the liquid crystal display in this state appears to have a silver color.

When an electric field is applied to liquid crystal material 18, its crystals are aligned and the polarization of light passing through them is not affected. The light striking the lower polarizer 24 is then absorbed and, from the viewing surface 23, the display appears black instead of silver. The electric field is applied to material 18 through the opposing layers 20 of metal oxide, which are etched to form the individual dots and segments of the liquid crystal display. Etched metal oxide layers 20 are illustrated in FIG. 1.

Figure 2:
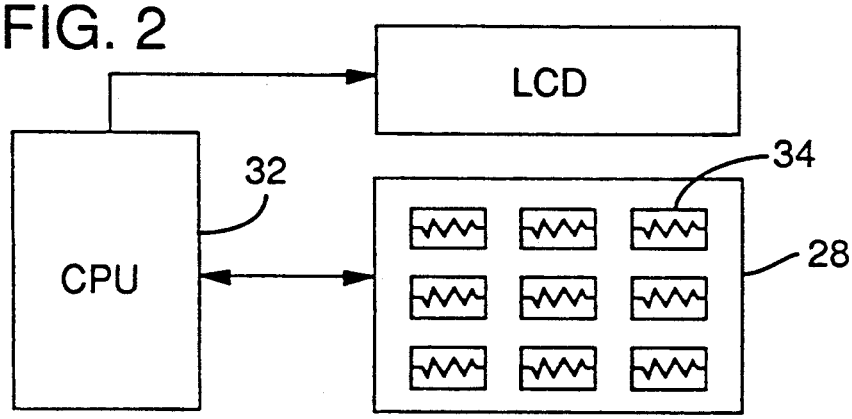
FIG. 2 is a block diagram of one embodiment of light detecting means employed in the invention and an associated central processing unit.
Figure 3A:
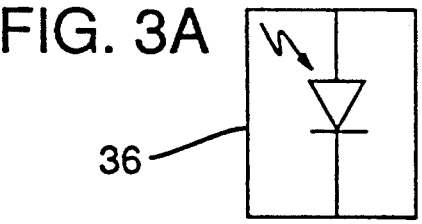
FIGS. 3A and 3B are other possible embodiments of the light detecting means.
Figure 3B:
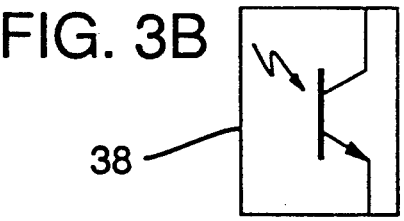

FIG. 2 shows array 28 connected to a control means such as a central processing unit (CPU) 32, which also controls the display of the LCD via material 18 and layers 20. Array 28 is shown as a set of LDRs 34 for illustration, but it will be understood by those skilled in the art that the light detecting means is not so limited. The light detecting means may be any type of device such as a light dependent resistor, phototransistor, photodiode, solar cell or photocell which is capable of sensing such a change in ambient light filtered through a transflector on an LCD. FIGS. 3A and 3B illustrate two such alternative devices, a photodiode 36 and phototransistor 38. When a finger or other object touches the viewing surface 23, it casts a shadow on the surface and thereby limits the light transmitted through the transflector 26 to array 28. This change in transmitted light affects the resistance of one or more LDRs 34. These LDRs communicate this change to the CPU 32 as a touching of the surface 23.

Figure 4:
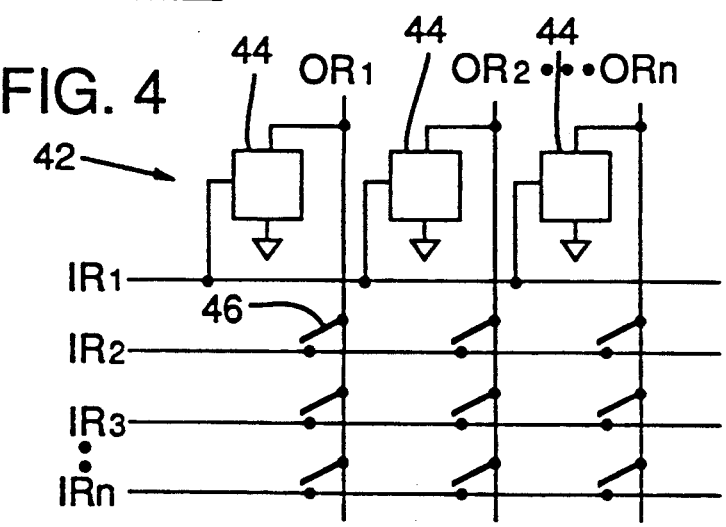
FIG. 4 is a diagram of a keyboard interface for signaling a detection by the light detecting means of a touch.

For communicating a detected touch to the CPU 32 or another device, signaling means may be provided. In the present embodiment signaling means in the form of a keyboard interface produces a signal in response to a shadow from a touch of the viewing surface 23. This signal also indicates the location of touch on the viewing surface. FIG. 4 shows one example of such signaling means in the form of a conventional keyboard interface 42 into which light detecting array 28 has been integrated. The interface 42 comprises a matrix of cross-conductive lines coupled together at several intersections by separate light dependent switches 44 and at other intersections by mechanical switches 46. Lines OR1-ORn are lines from output registers of CPU 32 and line IR1-IRn are lines to input registers of the CPU. In the context of a keyboard, switches 46 and switches 44 represent keys. The switches 46 are conventional keys such as appear on a computer or calculator keyboard and the switches 44 underlie displayed "keys" formed by dots and segments in the liquid crystal display.

Figure 5A:
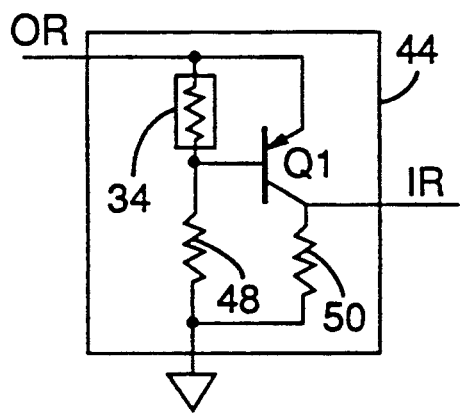
FIGS. 5A and 5B are two embodiments of light detecting switches that may be used, in the keyboard interface of FIG. 4.
Figure 5B:
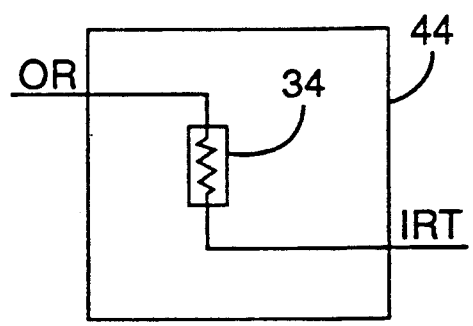

Switch 44 may be of several designs, such as shown in FIGS. 5A and 5B. FIG. 4 is shown with the switch design of FIG. 5A. In FIG. 5A, an LDR 34 forms a voltage divider with a resistor 48 from an OR line to ground. A transistor Q1 has its emitter connected to the OR line and its base connected to the node between the two resistors 34 and 48. The collector of Q1 is connected to an IR line. When not covered, LDR 34 has low resistance and transistor Q1 is off, the voltage at the base being about equal to the voltage at the emitter. With Q1 off, the collector is pulled to ground through a third resistor 50 and produces a logic low signal regardless of the voltage on the OR line. If the LDR 34 is covered, however, its resistance increases and the voltage at the base of Q1 rises as the relative values of resistances in the voltage divider change. If a high logic signal is applied concurrently to the OR line as during the normal strobing of the keyboard, Q1 will then conduct and the collector will produce a high logic signal. FIG. 5B shows an alternative design, in which the LDR 34 is connected directly between the OR line and the IR line. This design, however, produces a signal inversion on the IR line. If the OR line is high and LDR 34 is covered, the IR line is driven low because of the voltage drop across the LDR. If the LDR is not covered, indicating no touch, the IR line is pulled high. As discussed below, the signal on the IR line must thus be inverted before being read by the input registers of the CPU 32.

Referring again to FIG. 4, each displayed key may be actuated by touching the viewing surface to cast a shadow over the underlying switch 44. To determine if a switch 44 has detected a touch or if a switch 46 has been pressed, the interface 42 is scanned by the CPU 32 by strobing output register lines OR1-ORn individually with high logic signals. If an LDR 34 within a switch 44 is covered by a touch, the output of the switch will be high. Input register lines IR1-IRn are then each examined by the CPU for a logic high signal indicating a touch opposite a switch 44 or a press of a switch 46.

If the switch embodiment of FIG. 5B is preferred, then a separate special IRT line (for IRTouch) should be used for the switches 44. The signal inversion and pull down resistor of the line would likely be done outside the interface 42 and within an integrated circuit before being read by the CPU. Non-strobed OR lines should be allowed to float to prevent voltage interactions on IRT.

The intensity of the ambient light passing through surface 23 may change for reasons other than the touching of the surface. For example, ambient light indoors may vary from the light outdoors, especially on sunny days, or a non-touching portion of a finger may cast a shadow over another portion of array 28. It may be desirable, therefore, to distinguish between lighter shadows from these sources and darker shadows from an actual touch of surface 23. One approach for distinguishing changes in light levels is a threshold adjustment means. Such means can adjust the threshold level of transmitted light that must be detected by the LDRs 34 to indicate a touching of the viewing surface 23.

Figure 6A:
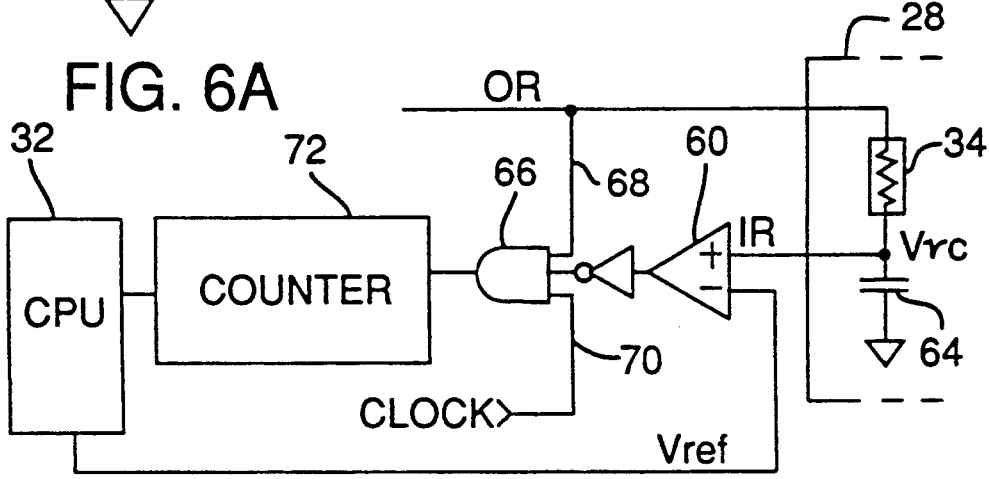
FIGS. 6A and 6B are two embodiments of means for adjusting the detection threshold of the light detecting means.
Figure 6B:
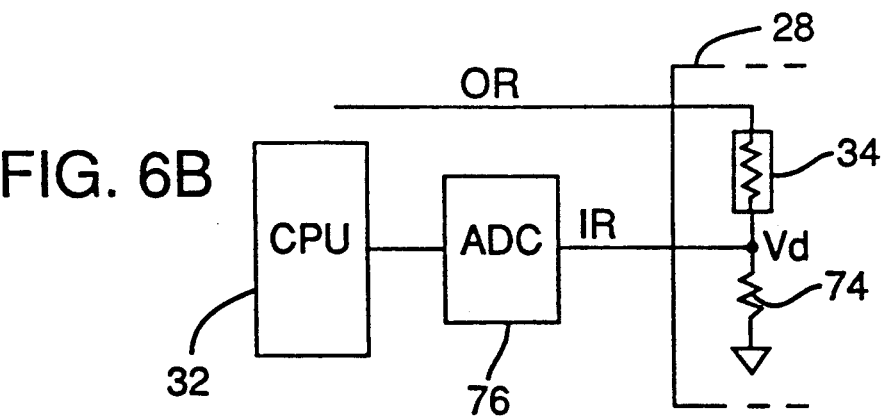

Several techniques for adjusting the threshold are shown in FIGS. 6A and 6B. In FIG. 6A, an LDR 34 in array 28 is shown connected to a comparator 60. The comparator compares a voltage Vrc measured between LDR 34 and a capacitor 64 against a reference voltage Vref. The output of comparator 60 is inverted and applied to an AND gate 66 whose other inputs include an OR line 68 and a clock line 70. When the OR line is strobed high, an RC circuit is formed with LDR 34 and capacitor 64 to ground. As Vrc rises, gate 66 produces pulses that are counted by a counter 72 until Vrc exceeds Vref. The output of the counter is then read by CPU 32. The pulse count obtained during the strobe is a measure of the light intensity hitting LDR 34: the lower the intensity (caused by a darker shadow), the greater the resistance and the higher the count. The CPU 32 may then compare the count against other counts obtained from adjacent LDRs as well as a reference count to determine if and where the surface 23 has been touched. Any variation in sensitivity of the separate LDRs may be taken into account by the CPU 32 in reviewing the counts versus a reference count. If the LDRs 34 within the array 28 uniformly show a change in light intensity, the CPU may judge this to be a change in ambient light and adjust Vref or the reference count appropriately.

FIG. 6B shows an alternative embodiment of a threshold adjustment means which is simpler in design. The voltage Vd between LDR 34 and a resistor 74 to ground is applied as the analog input to an analog-to-digital converter (ADC) 76. When the OR line is strobed high, Vd is converted by the ADC into a digital value that may be compared against reference digital values to determine if and where the surface 23 has been touched. As in the first embodiment, the reference values may be adjusted if the LDRs 34 across array 28 uniformly show a change in detected light intensity.

The threshold adjustment means may be inserted between the CPU 32 and the OR and IR lines shown in FIG. 4. To reduce cost, one or more adjustment means may be switched among the different LDRs as they are strobed. Refinements are also possible. If the LCD is part of a device that is stored in a case that may be open and closed, the adjustment means may further be designed to distinguish between a change in light intensity caused by a touch or case closure. One technique could be to compare values received from the various LDRs to see if the entire array appears to be covered at one time. If so, the device may be shut off since it can no longer be viewed. This technique could also be applied to detect a total lack of ambient light, as caused by shutting off the lights in a room.

Figure 7:
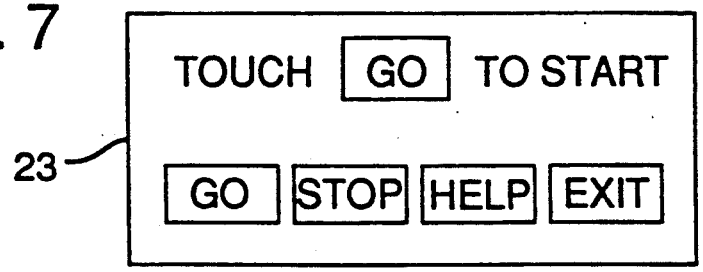
FIG. 7 is a top view of a liquid crystal display showing locations of "keys" that must be touched for the light detecting means to detect the touch.

To use the touch screen 10, CPU 32 is programmed to indicate where the viewing surface 23 must be touched for the underlying LDRs 34 to detect the touch. An example of keys displayed at the viewing surface is shown in FIG. 7. These keys may also be "soft" keys, in that their functions can be redefined by the device incorporating the touch screen 10. Labels associated with each displayed key, such as GO and STOP in FIG. 7, would change to reflect the present function.

I have illustrated and described the principles of the invention in several embodiments. These embodiments are but examples, and it should be apparent to those skilled in the art that the invention can be modified in arrangement and detail without departing from such principles. For example, there are other, equivalent threshold adjustment means and signaling means which I have not noted here. I claim all such equivalents and modifications coming within the scope of the following claims.

I claim:

1. A touch screen comprising:
    a liquid crystal display having a viewing surface through which light passes into and out of the display and a back surface comprising a transflector for reflecting some of the light back through the display and for transmitting some of the light; and
    light detecting means for detecting a change in the light transmitted through the transflector caused by a touching of the viewing surface.

2. The touch screen of claim 1 in which the light detecting means comprises a light dependent resistor whose resistance varies with the intensity of the light detected.

3. The touch screen of claim 1 in which the light detecting means comprises a phototransistor.

4. The touch screen of claim 1 in which the light detecting means comprises a photodiode.

5. The touch screen of claim 1 including threshold adjustment means for adjusting a threshold level of transmitted light that the light detecting means must detect to indicate a touching of the viewing surface.

6. The touch screen of claim 5 in which the threshold adjustment means includes a comparator for comparing output of the light detecting means against a reference level.

7. The touch screen of claim 5 in which the threshold adjustment means includes an analog-to-digital converter for comparing output of the light detecting means against a reference level.

8. The touch screen of claim 1 including signaling means coupled to the light detecting means for producing a signal in response to a detection of a change in the transmitted light caused by a touching of the viewing surface, the signal produced indicating the location of the touch.

9. A touch screen comprising:
    a liquid crystal display having a viewing surface through which light passes into and out of the display and a back surface comprising a transflector for reflecting some of the light back through the display and for transmitting some of the light;
    light detecting means for detecting a change in the light transmitted through the transflector caused by a touching of the viewing surface; and
    a keyboard interface having a matrix of conductive lines coupled together at intersections by separate light detecting means, each light detecting means being a key that may be actuated by touching the viewing surface at a location that limits the light transmitted to the light detecting means.

10. The touch screen on claim 1 including means for controlling the liquid crystal display to indicate where the viewing surface must be touched for the light detecting means to detect the touch.

11. The touch screen of claim 1 in which the light detecting means comprises a plurality of separate light detecting devices.

12. A touch screen comprising:
- a liquid crystal display having a viewing surface through which light passes into and out of the display and a back surface comprising a transflector for reflecting some of the light back through the display and for transmitting some of the light;
- a plurality of separate light detecting means adjacent to the transflector for detecting a change in the light transmitted through the transflector caused by a touching of the viewing surface; and
- a keyboard interface comprising a conductive line connected to each separate light detecting means, each such means being a key that may be actuated by touching the viewing surface at a location that limits the light transmitted to the light detecting means sufficiently for the means to change the logic state of a signal on the connected line.

13. The touch screen of claim 12 in which the light detecting means comprises light dependent switches and the keyboard interface includes a matrix of conductive lines coupled together at intersections by separate light detecting switches.

14. The touch screen of claim 13 in which the keyboard interface includes lines connected to keys other than light dependent switches.

15. A touch screen comprising:
- a liquid crystal display having a viewing surface through which light passes into and out of the display and a back surface comprising a transflector for reflecting some of the light back through the display and for transmitting some of the light;
- a plurality of separate light detecting means adjacent to the transflector for detecting a change in the light transmitted through the transflector caused by a touching of the viewing surface;
- signaling means coupled to the separate light detecting means for producing a signal in response to a detection of a change in transmitted light caused by a touching of the viewing surface, the signal produced indicating the location of the touch; and
- means for controlling the liquid crystal display to indicate where the viewing surface must be touched for a light detecting means to detect the touch.

* * * * *